United States Patent
Wu

(10) Patent No.: US 10,965,923 B2
(45) Date of Patent: Mar. 30, 2021

(54) PROJECTION DEVICE AND PROJECTION METHOD THEREOF

(71) Applicant: Coretronic Corporation, Hsin-Chu (TW)

(72) Inventor: Jian-Jiun Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/746,971

(22) Filed: Jan. 20, 2020

(65) Prior Publication Data

US 2020/0244938 A1 Jul. 30, 2020

(30) Foreign Application Priority Data

Jan. 24, 2019 (CN) .......................... 201910066994.X

(51) Int. Cl.
*H04N 9/31* (2006.01)
(52) U.S. Cl.
CPC ........... *H04N 9/3194* (2013.01); *H04N 9/317* (2013.01); *H04N 9/3179* (2013.01)
(58) Field of Classification Search
CPC .... H04N 9/3194; H04N 9/317; H04N 9/3179; H04N 9/3114; H04N 9/3185; G03B 21/142
USPC .................................................. 348/177, 743
See application file for complete search history.

(56) References Cited

U.S. PATENT DOCUMENTS

| | | | |
|---|---|---|---|
| 6,811,267 B1 * | 11/2004 | Allen ................... | G03B 21/005 348/589 |
| 2006/0291014 A1 * | 12/2006 | Hirata ................... | H04N 9/3194 358/504 |
| 2011/0216205 A1 * | 9/2011 | Flatt ..................... | H04N 9/3147 348/189 |
| 2014/0044461 A1 * | 2/2014 | Miyamoto ............... | C08K 3/04 399/308 |
| 2015/0237317 A1 * | 8/2015 | Ehara .................... | G06F 3/0425 348/745 |
| 2015/0296150 A1 * | 10/2015 | Benmokhtar Benabdellah ........... | G02B 27/1033 348/164 |
| 2016/0216778 A1 * | 7/2016 | Yu ......................... | G06F 3/0317 |
| 2018/0309968 A1 * | 10/2018 | Tanaka .................... | G09G 5/00 |

FOREIGN PATENT DOCUMENTS

| | | | |
|---|---|---|---|
| CN | 203012335 | | 6/2013 |
| CN | 108575029 | | 9/2018 |
| JP | 2005037771 A | * | 2/2005 |

* cited by examiner

*Primary Examiner* — Michael Lee
(74) *Attorney, Agent, or Firm* — JCIPRNET

(57) ABSTRACT

A projection device and a projection method are provided. The projection device includes a projection lens, an image generation optical path module, an image capturing device and a controller. The image generation optical path module generates a visible light image and an invisible light image according to a control signal, and projects the visible light image and the invisible light image to a projection area through the projection lens. The image capturing device photographs the projection area to obtain an invisible light reference image. The controller is coupled to the projection lens, the image generation optical path module and the image capturing device, and corrects at least one of the projection lens and the control signal according to the invisible light reference image and the invisible light image.

12 Claims, 7 Drawing Sheets

PROJECTION DEVICE AND PROJECTION METHOD THEREOF

CROSS-REFERENCE TO RELATED APPLICATION

This application claims the priority benefit of China application serial no. 201910066994.X, filed on Jan. 24, 2019. The entirety of the above-mentioned patent application is hereby incorporated by reference herein and made a part of this specification.

BACKGROUND

Technical Field

The invention relates to a projection technique, and particularly relates to a projection device with a self-correcting ability and a projection method thereof.

Description of Related Art

General, positions and the number of projectors will change along with display requirements. Each time when the positions and the number of projectors change, users must manually re-adjust projection-related parameters of the projectors in order to achieve expected projection effects.

For example, when the position of the projector or a projection area changes, the user must manually re-adjust a focal length of a projection lens or perform a trapezoidal correction, etc., in order to project a clear image with a normal aspect ratio and no warp. For another example, when a plurality of projectors is applied to commonly project a large image, the user must adjust display content of each projector, such that the projection content of each projector may be spliced into a natural and distortion-free large image. However, such process is time-consuming and laborious, and human errors often lead to inaccurate adjustments.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a projection device and a projection method thereof, which are adapted to automatically correct a lens parameter or adjust image content to improve projection quality and user experience.

Other objects and advantages of the invention may be further illustrated by the technical features broadly embodied and described as follows.

In order to achieve one or a portion of or all of the objects or other objects, an embodiment of the invention provides a projection device including a projection lens, an image generation optical path module, an image capturing device and a controller. The image generation optical path module is configured to generate a visible light image and an invisible light image according to a control signal, and project the visible light image and the invisible light image to a projection area through the projection lens. The image capturing device is configured to photograph the projection area to obtain an invisible light reference image. The controller is coupled to the projection lens, the image generation optical path module and the image capturing device, and is configured to correct at least one of the projection lens and the control signal according to the invisible light reference image and the invisible light image.

In order to achieve one or a portion of or all of the objects or other objects, an embodiment of the invention provides a projection method adapted to a projection device. The projection method includes following steps: generating a visible light image and an invisible light image according to a control signal, and projecting the visible light image and the invisible light image to a projection area through a projection lens of the projection device; photographing the projection area to obtain an invisible light reference image; and correcting at least one of the projection lens and the control signal according to the invisible light reference image and the invisible light image.

According to the above description, in the projection device and the projection method of the embodiment of the invention, the visible light image and the invisible light image are projected to the same projection area through the same projection lens, and the projection area is photographed to obtain the invisible light reference image, such that the projection lens or the image content of the projected visible light image is corrected according to the projected invisible light image and the photographed invisible light reference image. In this way, a lens parameter is automatically corrected or the image content is automatically adjusted without influencing a normal projection, so as to improve the projection quality and the user experience.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "left," "right," "front," "back," etc., is used with reference to the orientation of the Figure(s) being described and are not intended to be limiting of the invention. Moreover, the terms of connection, coupling and the like used in the invention are to explain signal transmission between two devices, and are not only limited to the direct contact relationship between the two devices.

Figure 1:
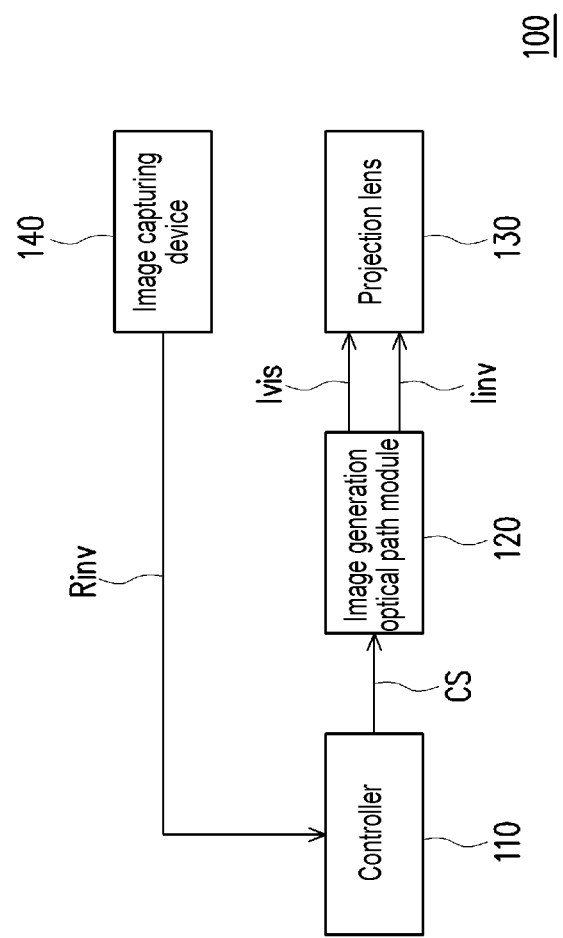
FIG. 1 is a block diagram of a projection device according to an embodiment of the invention.

FIG. 1 is a block diagram of a projection device according to an embodiment of the invention.

Referring to FIG. 1, the projection device 100 includes a controller 110, an image generation optical path module 120, a projection lens 130 and an image capturing device 140, where the controller 110 is coupled to the image generation optical path module 120, the projection lens 130 and the image capturing device 140.

In the embodiment, the controller is a combination of a control chip (for example, a TI chip) and a Field Programmable Gate Array (FPGA). However, the invention is not limited thereto. In other embodiments, the controller 110 may also be implemented by a Central Processing Unit (CPU), or other programmable general purpose or special purpose microprocessor, a Digital Signal Processor (DSP), a programmable controller, an Application Specific Integrated Circuits (ASIC), a Programmable Logic device (PLD) or other similar device or a combination of the above devices.

In the embodiment, the controller 110 may receive an image signal coming from outside the projection device 100 to generate a control signal CS and transmit the control signal CS to the image generation optical path module 120. The image generation optical path module 120 generates a visible light image Ivis and an invisible light image Iinv according to the control signal CS, and the visible light image Ivis and the invisible light image Iinv are projected to a projection area (not shown) through the same projection lens 130. Particularly, the visible light image Ivis projected to the projection area is an image suitable of a user to view, for example, a picture or a video, etc., input by the image signal; and the invisible light image Iinv projected to the projection area is an image used for implementing a subsequent correction.

In the embodiment, the image capturing device 140 is a combination of a video camera and a visible light filter element (for example, a visible light filter), which is used for filtering the visible light when photographing the projection area, so as to obtain an invisible light reference image Rinv and transmit the same back to the controller 110. It should be noted that as long as it is suitable for photographing the projection area and obtaining the invisible light reference image Rinv, detailed implementation of the image capturing device 140 is not limited by the invention. Particularly, based on factors such as a projection parameter (for example, a focal length, etc.) of the projection lens 130 or a surface flatness of the projection area, the invisible light image Iinv generated by the image generation optical path module 120 and the invisible light reference image Rinv obtained by the image capturing device 140 may be the same or different.

It should be noted that in the embodiment, the image generation optical path module 120 may overlap the visible light image Ivis and the invisible light image Iinv in the projection area. Therefore, the controller 110 may know an actual display status of the visible light image Ivis in the projection area from an actual display status (for example, the invisible light reference image Rinv) of the invisible light image Iinv in the projection area.

In the embodiment, the controller 110 may calculate an item of the projection device 100 that need to be corrected and correct the same according to the invisible light image Iinv and the invisible light reference image Rinv.

In some embodiments, the projection device 100 has abilities of auto-focusing and auto-adjusting of a projection position, etc. To be specific, according to the known invisible light image Iinv and the invisible light reference image Rinv, the controller 110 may correct the projection lens 130 to adjust a focal length, an aspect ratio, a shape, a position, etc., of the invisible light reference image Rinv. Since the invisible light image Iinv and the visible light image Ivis are projected through the same projection lens 130, the projection lens 130 corrected according to the invisible light reference image Rinv may also make the visible light image Ivis projected to the projection area to have a proper focal length, aspect ratio, shape and position, etc.

In some embodiments, the projection device 100 has abilities of automatic warp adjustment, automatic splicing adjustment, etc. To be specific, the controller 110 may also determine whether the image content of the visible light image Ivis need to be adjusted according to the known invisible light image Iinv and the invisible light reference image Rinv, and adjusts the image content required to be adjusted by adjusting the control signal. For example, if the controller 110 determines that the invisible light reference image Rinv is warped, it represents that the visible light image Ivis projected to the projection area is also warped. Therefore, the controller 110 may perform pre-warping on the visible light image Ivis to generate the control signal CS, such that the pre-warped visible light image Ivis is no longer warped after being projected to the projection area. For another example, when it is required to splice the visible light image Ivis of the projection device 100 with a projection image of other projection device, the controller 110 may determine a relative position of the splicing according to the invisible light image Iinv and the invisible light reference image Rinv, and perform corresponding edge blurring (for example, through a distance transform method, etc.) on the visible light image Ivis to accordingly generate the control signal CS, so as to implement natural splicing.

It should be noted that when the controller 110 adjusts (for example, performs pre-warping or edge blurring on) the image content of the visible light image Ivis, the controller 110 also adjusts the image content of the invisible light image Iinv, so that an adjustment state of the image content may be fed back to the controller 110 through the invisible light reference image Rinv, so as to improve the accuracy of adjustment. Moreover, the invention does not limit a detail and specific item that the controller 110 performs the correction according to the invisible light image Iinv and the invisible light reference image Rinv, which may be implemented by those skilled in the art according to actual needs.

Two embodiments are provided below to describe implementations of the projection device 100, and the image generation optical path module 120 has different designs in the following two embodiments.

Figure 2A:
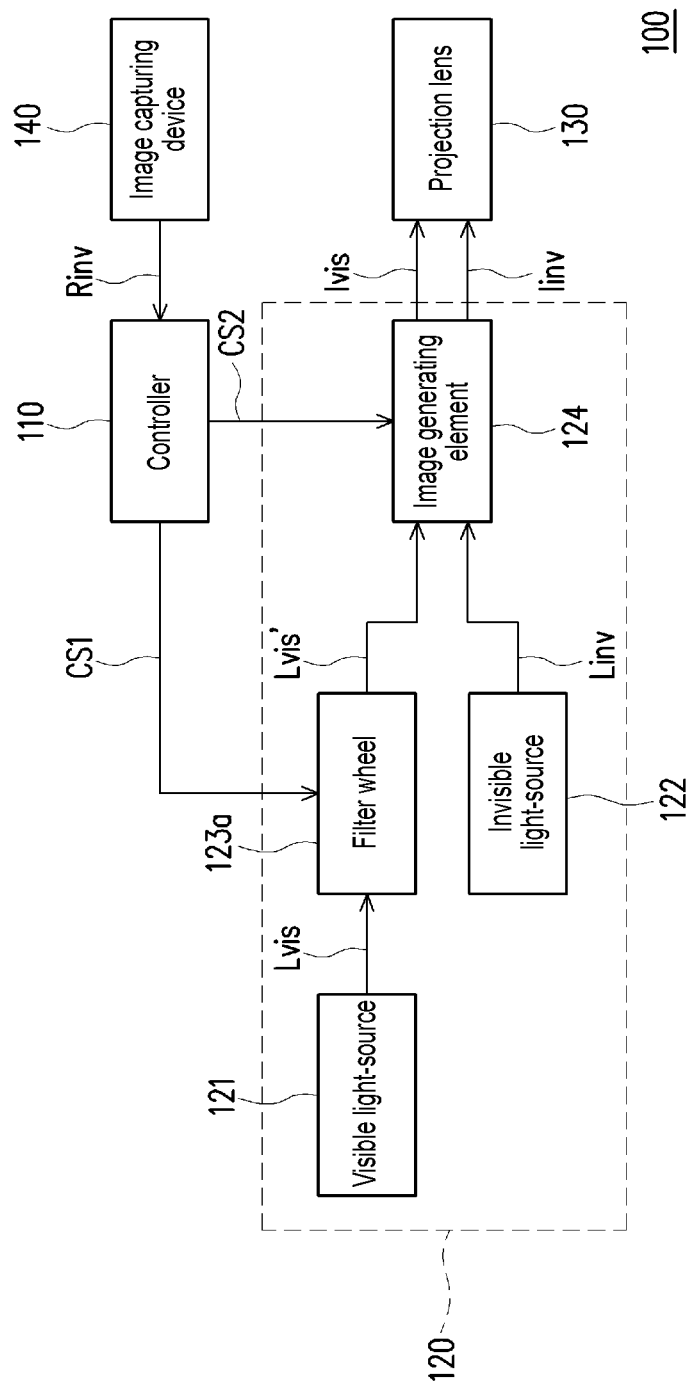
FIG. 2A is a block diagram of a projection device according to an embodiment of the invention.
Figure 2B:
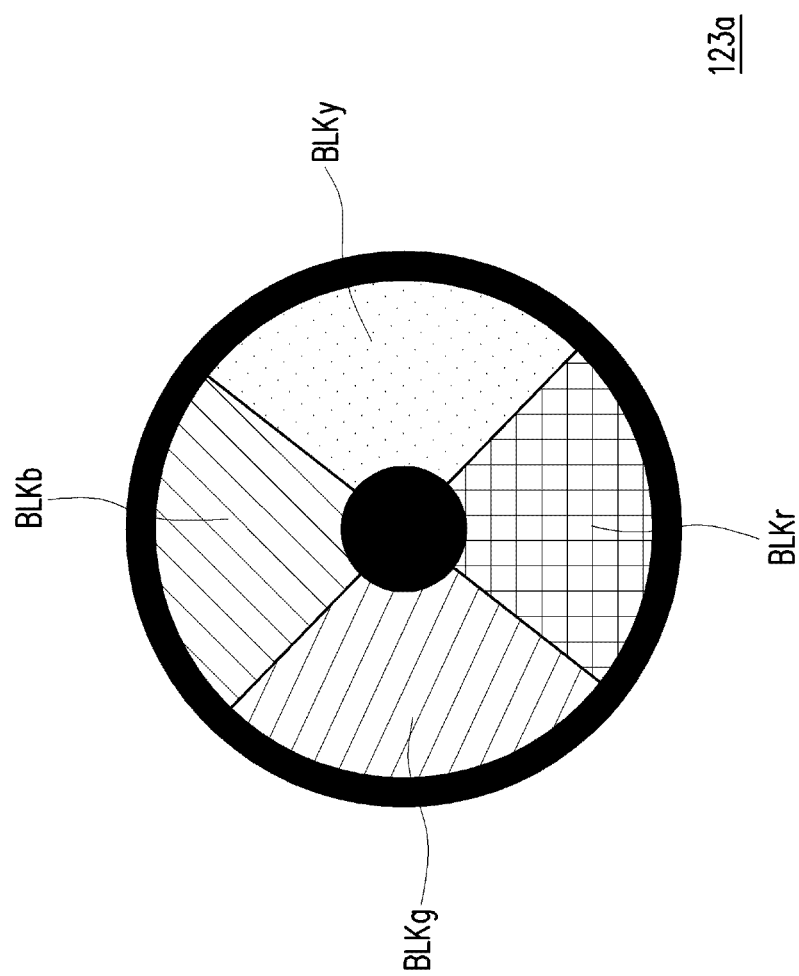
FIG. 2B is a schematic diagram of a filter wheel according to an embodiment of the invention.

FIG. 2A is a block diagram of a projection device according to an embodiment of the invention; and FIG. 2B is a schematic diagram of a filter wheel according to an embodiment of the invention.

Referring to FIG. 2A first, the image generation optical path module 120 includes a visible light-source 121, an invisible light-source 122, a filter wheel 123a and an image generating element 124. In the embodiment, the filter wheel 123a is disposed between the visible light-source 121 and the image generating element 124, and the visible light Lvis emitted by the visible light-source 121 passes through the filter wheel 123a to reach the image generating element 124, and the invisible light Linv emitted by the invisible light-source 122 reaches the image generating element 124 without passing through the filter wheel 123a.

In the embodiment, the visible light-source 121 is configured to emit the visible light Lvis of a plurality of different colors, which is, for example, implemented by a laser diode or a Light-Emitting Diode (LED) in collaboration with a wavelength conversion element such as a phosphor wheel, etc., though the invention is not limited thereto. In the embodiment, the visible light-source 121 may emit the visible light Lvis of a red color, a green color, a blue color and a yellow color.

Referring to FIG. 2B, in the embodiment, the filter wheel 123a includes a plurality of visible light blocks BLKr, BLKg, BLKb, BLKy, which respectively allow the visible light Lvis of the red color, the green color, the blue color and the yellow color to pass through to form a visible light Lvis' of the red color, the green color, the blue color and the yellow color to reach the image generating element 124.

In the embodiment, the control signal CS includes a first control signal CS1 and a second control signal CS2. The controller 110 may control the filter wheel 123a to rotate and control a rotation speed of the filter wheel 123a through the first control signal CS1, and a timing that the visible light Lvis' of the red color, the green color, the blue color and the yellow color reaches the image generating element 124 is related to the rotation speed of the filter wheel 123a.

In the embodiment, the invisible light-source 122 is configured to emit the invisible light Linv such as infrared light, etc.

In the embodiment, the controller 110 may control the image generating element 124 through the second control signal CS2. The image generating element 124 may convert the visible light Lvis' of various colors coming from the filter wheel 123a into image content of corresponding colors in the visible light image Ivis according to the second control signal CS2, so as to form the visible light image Ivis. To be specific, according to the second control signal CS2, the image generating element 124 converts the red visible light Lvis' coming from the filter wheel 123a into the image content corresponding the red color in the visible light image Ivis, converts the green visible light Lvis' coming from the filter wheel 123a into the image content corresponding the green color in the visible light image Ivis, converts the blue visible light Lvis' coming from the filter wheel 123a into the image content corresponding the blue color in the visible light image Ivis, and converts the yellow visible light Lvis' coming from the filter wheel 123a into the image content corresponding the yellow color in the visible light image Ivis. The visible light image Ivis is transmitted to the projection lens 130, and is projected by the projection lens 130 to the projection area. On the other hand, the image generating element 124 may also convert the invisible light Linv coming from the invisible light-source 122 into the invisible light image Iinv according to the second control signal CS2, and transmits the invisible light image Iinv to the projection lens 130 for projecting to the projection area. In the embodiment, the image generating element 124 is a Digital Micro-mirror Device (DMD), and in other embodiments, the image generating element 124 may also be a reflectively light modulator such as a Liquid Crystal on Silicon (LCoS panel), etc. In some embodiments, the image generating element 124 may also be a transmissive light modulator such as a transparent liquid crystal panel, an electro-optical modulator, a maganeto-optic modulator, an Acousto-Optic Modulator (AOM), etc., which is not limited by the invention.

Figure 3A:
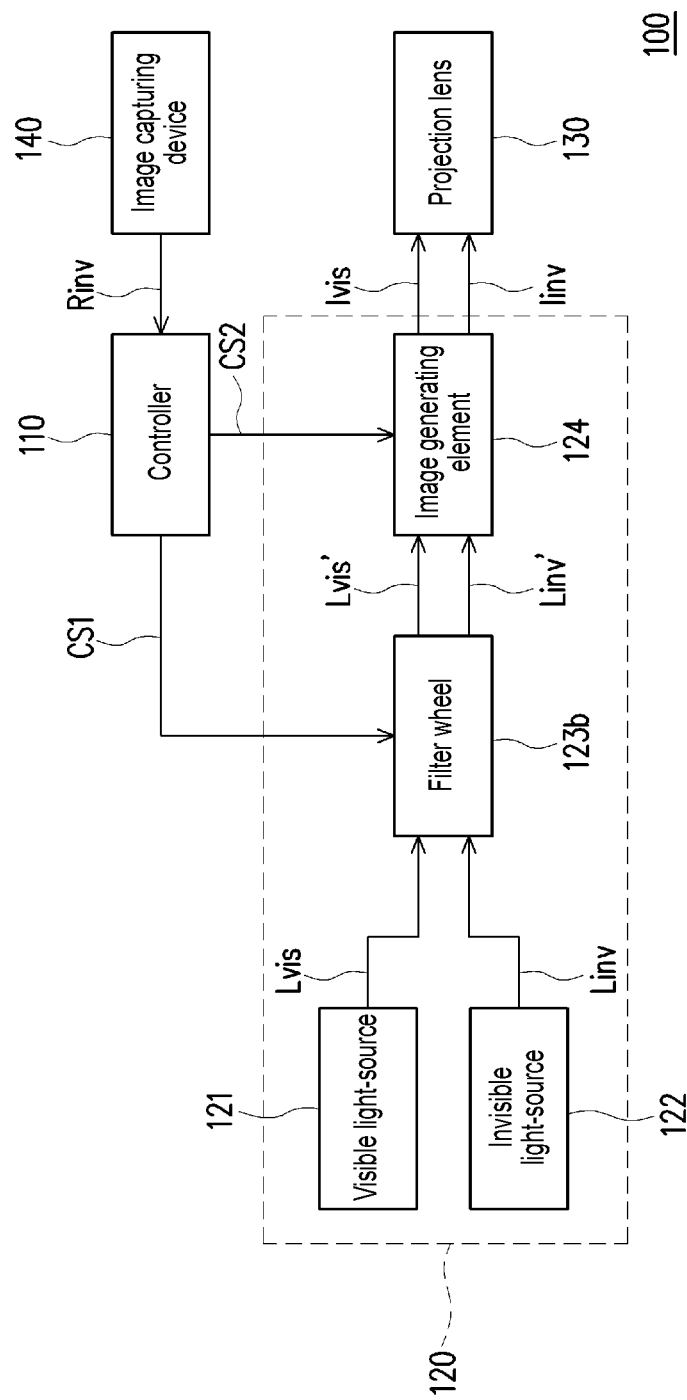
FIG. 3A is a block diagram of a projection device according to an embodiment of the invention.
Figure 3B:
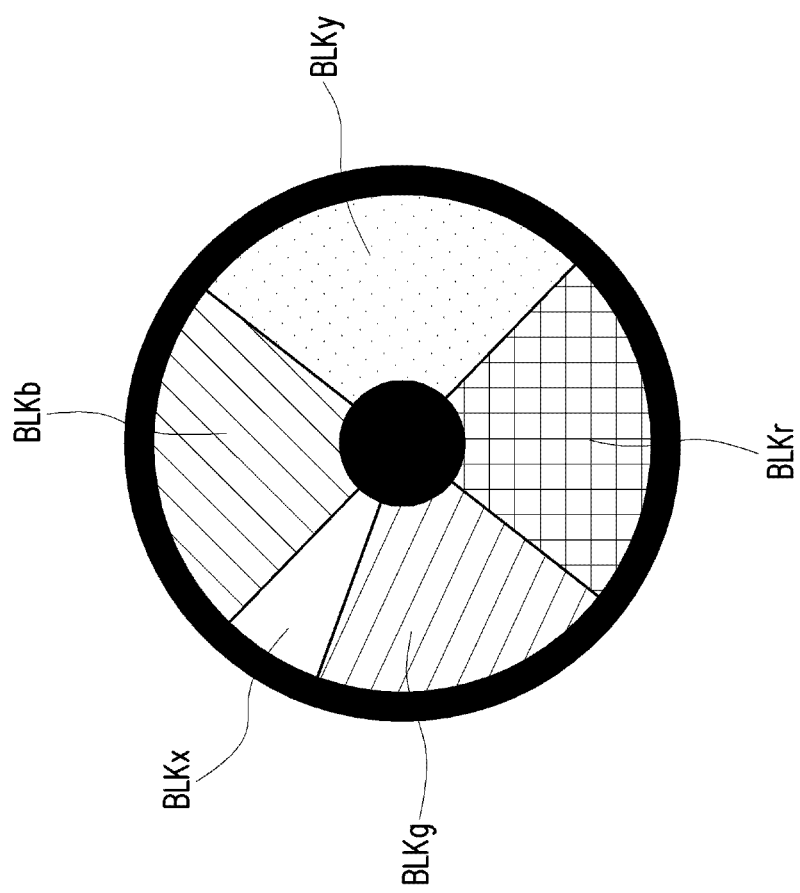
FIG. 3B is a schematic diagram of a filter wheel according to an embodiment of the invention.

FIG. 3A is a block diagram of a projection device according to another embodiment of the invention; and FIG. 3B is a schematic diagram of a filter wheel according to another embodiment of the invention.

Referring to FIG. 3A first, the image generation optical path module 120 includes a visible light-source 121, an invisible light-source 122, a filter wheel 123b and an image generating element 124. In the embodiment, the filter wheel 123b is disposed between the visible light-source 121 and the image generating element 124, and is also disposed between the invisible light-source 122 and the image generating element 124, and the visible light Lvis emitted by the visible light-source 121 and the invisible light Linv emitted by the invisible light-source 122 all pass through the filter wheel 123b to reach the image generating element 124.

In the embodiment, the visible light-source 121, the invisible light-source 122 and the image generating element 124 are the same with the visible light-source 121, the invisible light-source 122 and the image generating element 124 of the embodiment of FIG. 2A, so that details thereof are not repeated.

Referring to FIG. 3B, in the embodiment, the filter wheel 123b includes a plurality of visible light blocks BLKr, BLKg, BLKb, BLKy, which respectively allow the visible light Lvis of the red color, the green color, the blue color and the yellow color to pass through to sequentially form a visible light Lvis' of the red color, the green color, the blue color and the yellow color to reach the image generating element 124. Moreover, the filter wheel 123b further includes an invisible light block BLKx, which allows the invisible light Linv to pass through to form an invisible light LinV' to reach the image generating element 124. Particularly, since the filter wheel 123b includes the invisible light block BLKx, a ratio of an area occupied by the visible light blocks BLKr, BLKg, BLKb, BLKy is compressed, so that an overall brightness of the visible light image Iinv is accordingly decreased. In order to maintain projection quality of the visible light image Ivis, a ratio of an area occupied by the invisible light block BLKx in the filter wheel 123b has to be properly controlled, for example, to be smaller than a predetermined ratio threshold, etc.

In the embodiment, the control signal CS includes a first control signal CS1 and a second control signal CS2. The controller 110 may control the filter wheel 123b to rotate and control a rotation speed of the filter wheel 123b through the first control signal CS1, and control a conversion timing of the image generating element 124 in converting the visible light image Ivis of a plurality of colors and the invisible light image IinV through the second control signal CS2 according to the rotation speed of the filter wheel 123b and the ratio of the area occupied by the invisible light block BLKx. For example, the controller 110 controls a formation time of the visible light Lvis' of each color and an arrival time of the same reaching the image generating element 124 through the first control signal CS1, and controls the image generating element 124 to convert the visible light Lvis' of the red color into the image content corresponding to the red color in the visible light image Ivis within a time when the visible light Lvis' of the red color arrives, convert the visible light Lvis' of the green color into the image content corresponding to the green color in the visible light image Ivis within a time when the visible light Lvis' of the green color arrives, convert the visible light Lvis' of the blue color into the image content corresponding to the blue color in the visible light image Ivis within a time when the visible light Lvis' of the blue color arrives, convert the visible light Lvis' of the yellow color into the image content corresponding to the yellow color in the visible light image Ivis within a time when the visible light Lvis' of the yellow color arrives, and convert the invisible light Linv' into the invisible light image Iinv within a time when the invisible light Linv' arrives. The visible light image Ivis and the invisible light image Iinv are transmitted to the projection lens 130, and are projected to the projection area by the projection lens 130.

In this way, the projection device 100 may project the visible light image Ivis and the invisible light image Iinv to the projection area through the same projection lens 130, and photograph the invisible light reference image Rinv corresponding to the invisible light image Iinv to correct at least one of the projection lens 130 and the control signal.

Figure 4:
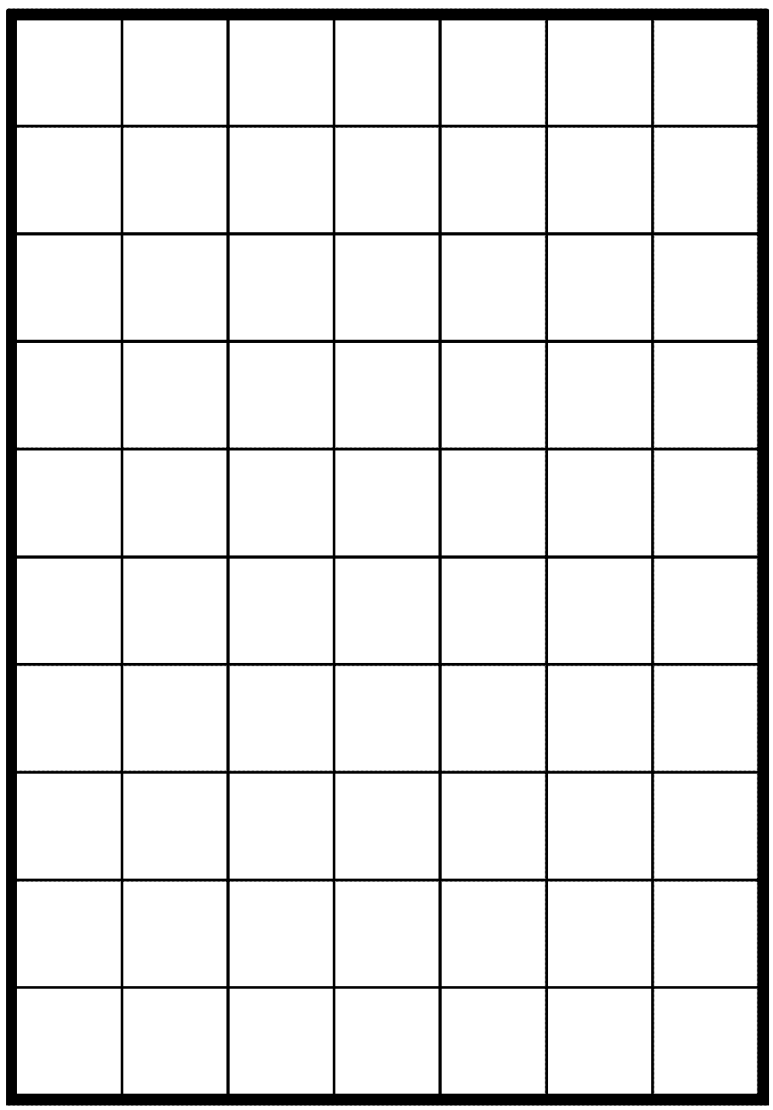
FIG. 4 is a schematic diagram of a predetermined pattern according to an embodiment of the invention.

FIG. 4 is a schematic diagram of a predetermined pattern according to an embodiment of the invention.

Referring to FIG. 4, the invisible light image Iinv is, for example, an image with a predetermined pattern PTN. The predetermined pattern PTN is, for example, grids with a high contrast. In this way, after the image capturing device 140 captures the invisible light reference image Rinv, the controller 110 may perform correction according to the predetermined pattern PTN and the invisible light reference image Rinv. For example, in automatic focusing, the controller 110 may use a contrast detection method to check the contrast in the invisible light reference image Rinv, so as to correct the focal length of the projection lens 130. For another example, in automatic warping adjustment, the controller 110 may perform corresponding pre-warping on the visible light image Ivis and the invisible light image Iinv according to whether the grids in the invisible light reference image Rinv are distorted until the grids in the invisible light reference image Rinv are not distorted. However, the invention is not limited thereto, and those skilled in the art may set the image content of the invisible light image Iinv according to an actual need and detailed method of performing correction according to the invisible light reference image Rinv.

In some embodiments, the image content of the invisible light image Iinv may also be the same with the image content of the visible light image Ivis, which is not limited by the invention.

Figure 5:
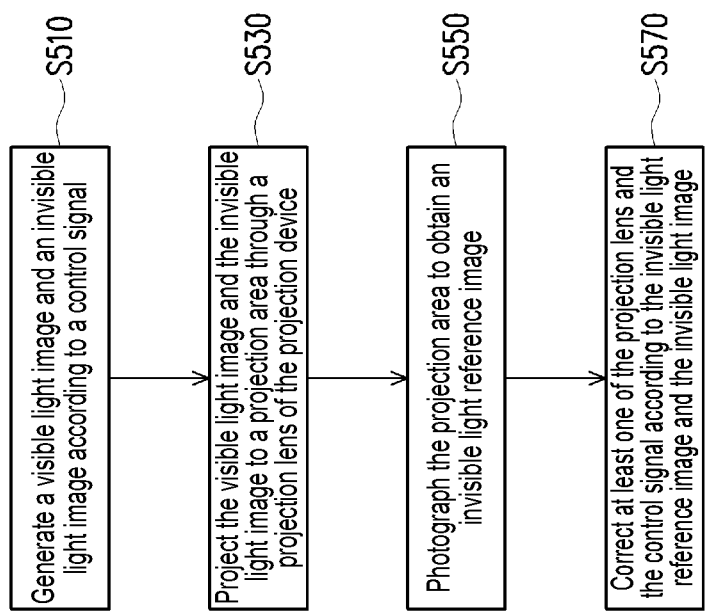
FIG. 5 is a flowchart illustrating a projection method according to an embodiment of the invention.

FIG. 5 is a flowchart illustrating a projection method according to an embodiment of the invention.

The embodiment of FIG. 5 is adapted to the projection device 100 of the aforementioned embodiment, so that the method is described below with reference of various components of the projection device 100. It should be noted that each step of the embodiment may refer to description of the aforementioned embodiment, and detail thereof is not repeated.

Referring to FIG. 5, first, the controller 110 generates the control signal CS, and the image generation optical path module 120 generates the visible light image Ivis and the invisible light image Iinv according to the control signal CS (step S510).

The image generation optical path module 120 transmits the generated visible light image Ivis and the invisible light image Iinv to the projection lens 130, so as to project the visible light image Ivis and the invisible light image Iinv to the projection area through the projection lens 130 (step S530).

The image capturing device 140 photographs the projection area to obtain the invisible light reference image Rinv corresponding to the invisible light image Iinv (step S550), and transmits back the invisible light reference image Rinv to the controller 110.

Then, the controller 110 corrects at least one of the projection lens 130 and the control signal according to the invisible light reference image Rinv and the invisible light image Iinv (step S570).

In summary, in the projection device and the projection method of the embodiment of the invention, the visible light image and the invisible light image are projected to the same projection area through the same projection lens, and then the projection area is photographed to obtain the invisible light reference image, such that the projection lens or the image content of the projected visible light image may be corrected according to the projected invisible light image and the photographed invisible light reference image. In this way, a lens parameter is automatically corrected or the image content is automatically adjusted without influencing a normal projection, so as to improve the projection quality and the user experience.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents. Moreover, any embodiment of or the claims of the invention is unnecessary to implement all advantages or features disclosed by the invention. Moreover, the abstract and the name of the invention are only used to assist patent searching. Moreover, "first", "second", etc. mentioned in the specification and the claims are merely used to name the elements and should not be regarded as limiting the upper or lower bound of the number of the components/devices.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection device, comprising:
   a projection lens;
   an image generation optical path module, configured to generate a visible light image and an invisible light image according to a control signal, and project the visible light image and the invisible light image to a projection area through the projection lens;
   an image capturing device, configured to photograph the projection area to obtain an invisible light reference image; and
   a controller, coupled to the projection lens, the image generation optical path module and the image capturing device, and configured to determine a relative position of splicing and correct at least one of the projection lens and the control signal according to the invisible light reference image and the invisible light image,
   wherein the image generation optical path module comprises:
   a visible light-source, configured to emit visible light;
   an invisible light-source, configured to emit invisible light;
   an image generating element, configured to convert the visible light into the visible light image and convert the invisible light into the invisible light image according to the control signal; and
   a filter wheel, disposed between the visible light-source and the image generating element, wherein the filter wheel comprises at least one visible light block, wherein the visible light passes through the at least one visible light block of the filter wheel to reach the image generating element, wherein the invisible light reaches the image generating element without passing through the filter wheel.

2. The projection device as claimed in claim 1, wherein the image capturing device comprises a visible light filter element.

3. The projection device as claimed in claim 1, wherein the invisible light image is overlapped with the visible light image in the projection area.

4. The projection device as claimed in claim 1, wherein when correcting at least one of the projection lens and the control signal according to the invisible light reference image and the invisible light image, the controller is configured to adjust a focal length of the projection lens.

5. The projection device as claimed in claim 1, wherein when correcting at least one of the projection lens and the control signal according to the invisible light reference image and the invisible light image, the controller is configured to adjust a projection position of the projection lens.

6. The projection device as claimed in claim 1, wherein when correcting at least one of the projection lens and the control signal according to the invisible light reference image and the invisible light image, the controller is configured to adjust the control signal to change image content of the visible light image and image content of the invisible light image.

7. A projection method applicable to a projection device, the projection method comprising:
   generating a visible light image and an invisible light image according to a control signal;
   projecting the visible light image and the invisible light image to a projection area through a projection lens of the projection device;
   photographing the projection area to obtain an invisible light reference image;
   determining a relative position of splicing according to the invisible light reference image and the invisible light image; and
   correcting at least one of the projection lens and the control signal according to the invisible light reference image and the invisible light image,
   wherein the step of generating the visible light image and the invisible light image according to the control signal comprises:
   generating visible light and invisible light, and making the visible light to pass through at least one visible light block of a filter wheel; and
   converting the visible light into the visible light image and converting the invisible light into the invisible light image according to the control signal, wherein the invisible light does not pass through the filter wheel.

8. The projection method as claimed in claim 7, wherein the step of photographing the projection area to obtain the invisible light reference image comprises:
   filtering the visible light when photographing the projection area to obtain the invisible light reference image.

9. The projection method as claimed in claim 7, wherein the invisible light image is overlapped with the visible light image in the projection area.

10. The projection method as claimed in claim 7, wherein the step of correcting at least one of the projection lens and the control signal according to the invisible light reference image and the invisible light image comprises:
    adjusting a focal length of the projection lens according to the invisible light reference image and the invisible light image.

11. The projection method as claimed in claim 7, wherein the step of correcting at least one of the projection lens and the control signal according to the invisible light reference image and the invisible light image comprises:
    adjusting a projection position of the projection lens according to the invisible light reference image and the invisible light image.

12. The projection method as claimed in claim 7, wherein the step of correcting at least one of the projection lens and the control signal according to the invisible light reference image and the invisible light image comprises:
    adjusting the control signal to change image content of the visible light image and image content of the invisible light image according to the invisible light reference image and the invisible light image.

* * * * *